United States Patent
Christian

(10) Patent No.: US 10,842,125 B1
(45) Date of Patent: Nov. 24, 2020

(54) PET CARRIER

(71) Applicant: Nathan Christian, Grant-Valkaria, FL (US)

(72) Inventor: Nathan Christian, Grant-Valkaria, FL (US)

( * ) Notice: Subject to any disclaimer, the term of this patent is extended or adjusted under 35 U.S.C. 154(b) by 0 days.

(21) Appl. No.: 16/882,916

(22) Filed: May 26, 2020

(51) Int. Cl.
*A01K 1/02* (2006.01)
*A01K 1/00* (2006.01)

(52) U.S. Cl.
CPC .......... *A01K 1/0245* (2013.01); *A01K 1/0058* (2013.01); *A01K 1/0064* (2013.01); *A01K 1/029* (2013.01)

(58) Field of Classification Search
CPC .... A01K 1/0245; A01K 1/029; A01K 1/0236; A01K 1/034
See application file for complete search history.

(56) References Cited

U.S. PATENT DOCUMENTS

| | | | |
|---|---|---|---|
| 108,187 A | 10/1870 | Rice | |
| 3,941,092 A * | 3/1976 | Winters | A01K 1/0245 |
| | | | 119/497 |
| 4,319,545 A | 3/1982 | Sou | |
| 5,669,331 A | 9/1997 | Richmond | |
| 5,671,697 A | 9/1997 | Rutman | |
| 5,960,744 A | 10/1999 | Rutman | |
| 5,967,090 A * | 10/1999 | Hui | A01K 1/0245 |
| | | | 119/453 |
| 6,196,161 B1 * | 3/2001 | Thurber | A01K 1/0245 |
| | | | 119/496 |
| D528,252 S * | 9/2006 | Van Skiver | D30/161 |
| 7,392,764 B2 | 7/2008 | Saavedra et al. | |
| 7,849,818 B2 * | 12/2010 | Matsuo | A01K 1/0107 |
| | | | 119/165 |
| 8,127,715 B2 | 3/2012 | Leung | |
| 8,347,815 B2 | 1/2013 | Leung | |
| 8,733,294 B2 | 5/2014 | Buck | |
| 9,554,553 B2 | 1/2017 | Casto et al. | |
| 10,271,514 B2 | 4/2019 | Fickes | |
| 2002/0023594 A1 * | 2/2002 | Greene, Jr. | A01K 1/0245 |
| | | | 119/496 |
| 2002/0100431 A1 | 8/2002 | Sherman et al. | |
| 2005/0284405 A1 | 12/2005 | Pomakoy-Poole et al. | |
| 2007/0089685 A1 | 4/2007 | Gottlieb et al. | |
| 2009/0314219 A1 * | 12/2009 | Bryson | A01K 1/0254 |
| | | | 119/496 |
| 2010/0037831 A1 | 2/2010 | Plante | |
| 2010/0043720 A1 * | 2/2010 | Yelverton | A01K 1/0245 |
| | | | 119/496 |
| 2010/0175633 A1 | 7/2010 | Krauss et al. | |
| 2011/0079971 A1 | 4/2011 | Lulevitch | |

(Continued)

*Primary Examiner* — Magdalena Topolski
*Assistant Examiner* — Katelyn T Truong
(74) *Attorney, Agent, or Firm* — Kelly G. Swartz; Widerman Malek, PL

(57) ABSTRACT

A pet carrier including a bottom portion and a top portion having an attachment portion secured to the back wall of the bottom portion and extending away from the back wall of the bottom portion distal the front wall of the bottom portion, wherein the attachment portion of the bottom portion rotatably secures to the attachment portion of the top portion, a first lobe extends from a portion of the first side wall distal the ceiling, and a second lob extends from a portion of the second side wall distal the ceiling.

18 Claims, 8 Drawing Sheets

(56) References Cited

U.S. PATENT DOCUMENTS

| | | |
|---|---|---|
| 2013/0125827 A1 | 5/2013 | Pietra |
| 2013/0233250 A1* | 9/2013 | Veness ................. A01K 1/0245 119/496 |
| 2016/0106060 A1 | 4/2016 | Sundwall |
| 2017/0318774 A1* | 11/2017 | Taylor ................. A01K 1/0245 |
| 2018/0132447 A1* | 5/2018 | McGeehan ............... B62B 1/14 |
| 2018/0279576 A1 | 10/2018 | Kim |
| 2018/0288964 A1 | 10/2018 | Tamiozzo |
| 2019/0183088 A1 | 6/2019 | Yang |
| 2019/0313597 A1 | 10/2019 | Chen |

\* cited by examiner

PET CARRIER

FIELD OF THE INVENTION

The present invention relates to systems pet carriers. More specifically, the present invention relates to a system used to transport a pet, limit the pet's field of view when the carrier is opened, and allow unobstructed access into and out of the carrier.

BACKGROUND OF THE INVENTION

There are many carriers available in the pet industry today. However, they contain many drawbacks making travelling with pets inconvenient and cause anxiety in the pet. Many of the carriers require a pet to be placed into or removed from the carrier through a small opening. In most known pet carriers, the only alternative to entering and exiting through a small opening is to disassemble the pet carrier into two halves and remove the pet through the opening formed by removing a top half of the carrier. Complete removal of the top half of the carrier while a pet is inside it causes a significant change to the pet's field of view and can be distressing to the pet. Therefore, a need exists for a pet carrier that provides a larger, unobstructed opening through which a pet may enter or exit the carrier and may be opened up while limiting the field of view of a pet within the carrier.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a pet carrier including a bottom portion and a top portion. The bottom portion may include a front wall, a back wall, a first side wall having a first edge secured to a first edge of the front wall and second edge secured to a first edge of the back wall, a second side wall having a first edge secured to a second edge of the front wall, which opposes the first edge of the front wall, and a second edge secured to a second edge of the back wall, which opposes the first edge of the back wall, a floor secured to a third edge of the front wall, wherein the third edge of the front wall extends from the first edge of the front wall to the second edge of the front wall, a third edge of the back wall, wherein the third edge of the back wall extends from the first edge of the back wall to the second edge of the back wall, a third edge of the first side wall, wherein the third edge of the first side wall extends from the first edge of the first side wall to the second edge of the first side wall, and a third edge of the second side wall, wherein the third edge of the second side wall extends from the first edge of the second side wall to the second edge of the second side wall, and an attachment portion secured to the back wall of the bottom portion and extending away from the back wall of the bottom portion distal the front wall of the bottom portion. The top portion may include a ceiling, a first side wall having a first edge secured to a first edge of the ceiling, a second side wall having a first edge secured to a second edge of the ceiling, which opposes the first edge of the ceiling, and an attachment portion secured to the first side wall of the top portion or the second side wall of the top portion. The attachment portion of the bottom portion may rotatably secure to the attachment portion of the top portion.

The top portion may further include a first lobe extending from a portion of the first side wall distal the ceiling and a second lobe extending from a portion of the second side wall distal the ceiling. The top portion may be positionable in an open configuration, in which a portion of the first lobe overlaps a fourth edge of the first side wall of the bottom portion, which opposes the third edge of the first side wall of the bottom portion, and a portion of the second lobe overlaps a fourth edge of the second side wall of the bottom portion, which opposes the third edge of the second side wall of the bottom portion, or rotatable 180 degrees with respect to the bottom portion to a closed configuration in which a second edge of the first side wall of the top portion, which opposes the first edge of the first side wall of the top portion, overlaps the fourth edge of the first side wall of the bottom portion and a second edge of the second side wall of the top portion, which opposes the first edge of the second side wall of the top portion, overlaps the fourth edge of the second side wall of the bottom portion.

The bottom portion may further include a second attachment point secured to the back wall of the bottom portion and extending away from the back wall of the bottom portion distal the front wall of the bottom portion.

The top portion may further include a second attachment portion secured to the first side wall of the top portion or the second side wall of the top portion, opposing the attachment point of the top portion.

The first lobe may have a radius of curvature extending from the attachment portion of the top portion. The second lobe may have a radius of curvature extending from the second attachment portion of the top portion.

The pet carrier may include a first door carried in the front wall of the bottom portion. The first door may include a mesh screen and may be hingedly secured to the front wall of the bottom portion. The front wall of the bottom portion may further include a fourth edge, extending from the first edge to the second edge and opposing the third edge, having a first portion approximate the first edge, a second portion approximate the second edge, and a void located between the first portion and second portion, wherein the first door is carried within the void.

The pet carrier may include a second door carried in the back wall of the bottom portion. The second door may include a plurality of apertures formed in a solid material and may be hingedly secured to the back wall of the bottom portion.

The pet carrier may include a securing mechanism having a first portion secured to the bottom portion and a second portion secured to a door, wherein the second portion has a device rotatably activated to engage a member of the second portion with the first portion to prevent movement of the door relative to the bottom portion.

The pet carrier may include a shoulder strap having a first end removably secured to the bottom portion at a first shoulder strap attachment point and a second end removably secured to the bottom portion at a second shoulder strap attachment point.

The pet carrier may include a door carried by the ceiling of the top portion and slidably positionable between an open configuration and a close configuration.

The pet carrier may include a handle hingedly secured to the top portion around a perimeter of the door carried by the ceiling, wherein the handle may be selectively positionable between an upright and a stowed position, wherein the stowed position is defined as placement of the door within a recess of the ceiling.

The pet carrier may include a handle secured to the top portion along an outer side of the first side wall or the second side wall, wherein the handle may be positionable between a deployed and a stowed configuration.

The pet carrier may include a first viewing port and a second viewing port located in the ceiling.

The pet carrier may include a recess located on a lower surface of the floor.

The pet carrier may include a ridge located on an upper surface of the ceiling, wherein the recess located on the lower surface of the floor is sized to receive the ridge when a first pet carrier is stacked atop a second pet carrier.

The pet carrier may include a first securing member secured to the bottom portion and a second securing member secured to the top portion wherein the first securing member and second securing member are cooperatively configured to removably secure the top portion to the bottom portion.

The first side wall of the bottom portion and the second side wall of the bottom portion may include apertures adapted for ventilation.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
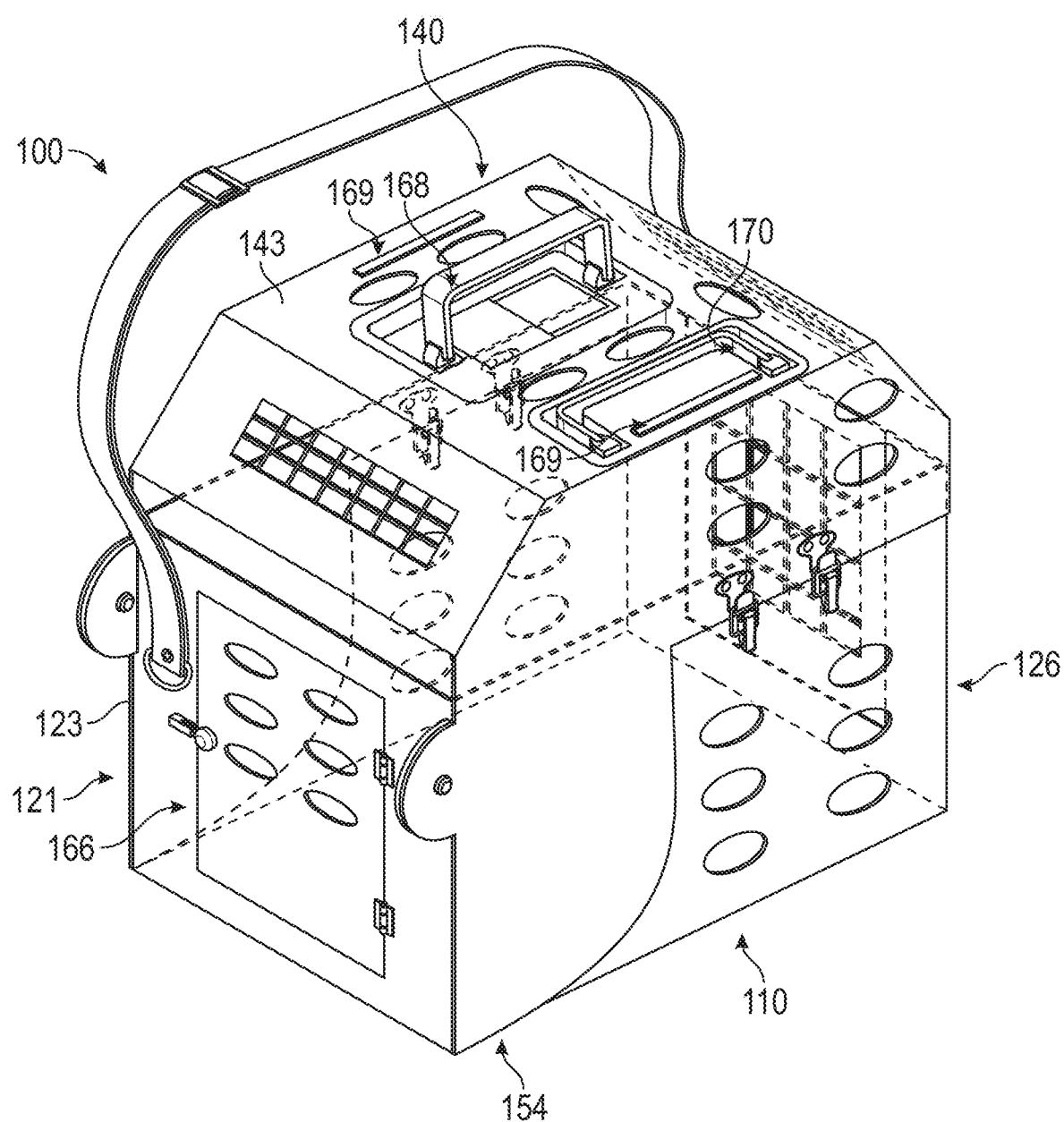
FIG. 1 is a perspective view of a pet carrier according to an embodiment of the present invention.
Figure 2:
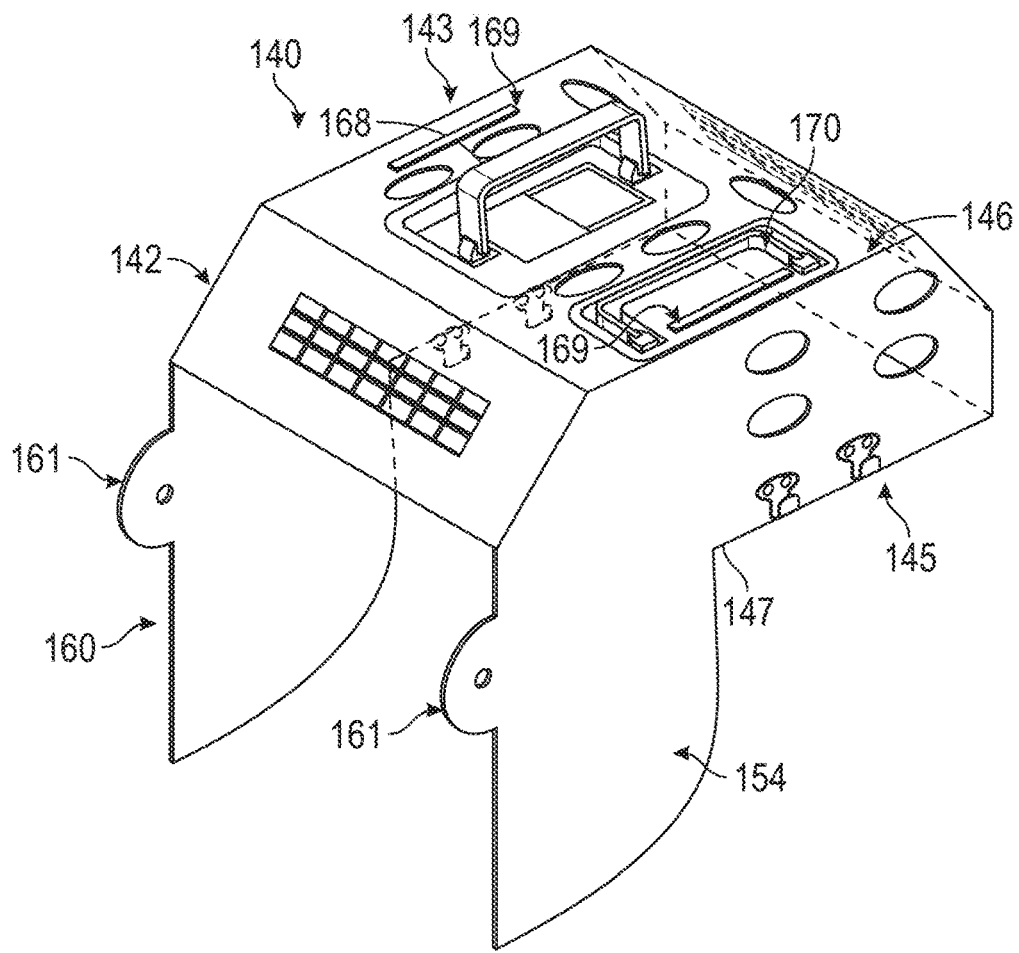
FIG. 2 is a perspective view of a top portion of the pet carrier of FIG. 1.
Figure 3:
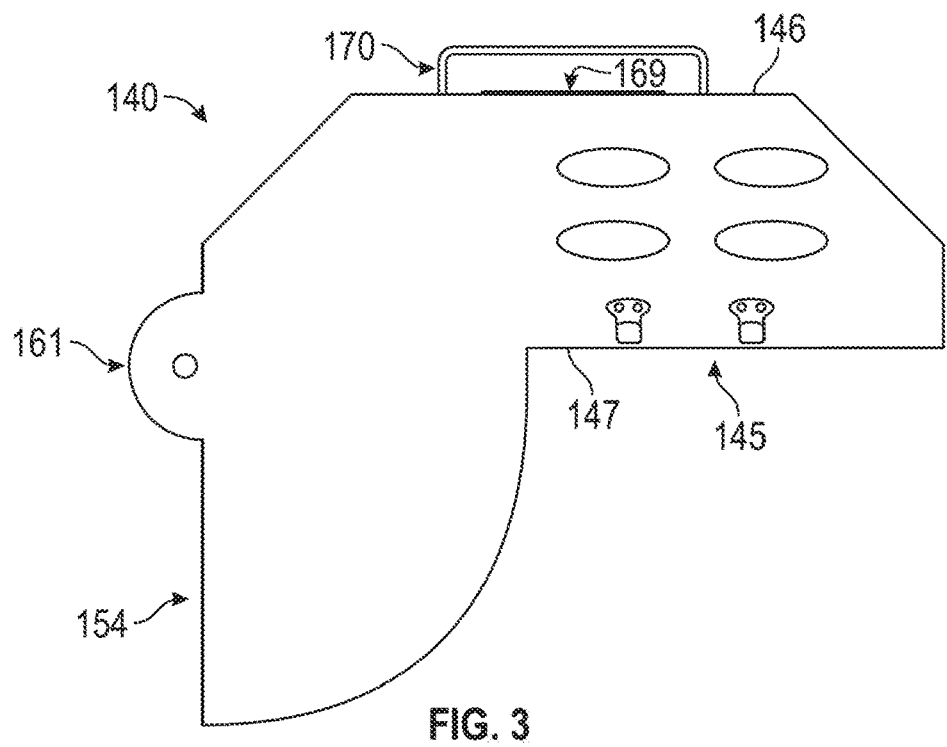
FIG. 3 is a side elevation view of the top portion of FIG. 2.
Figure 4:
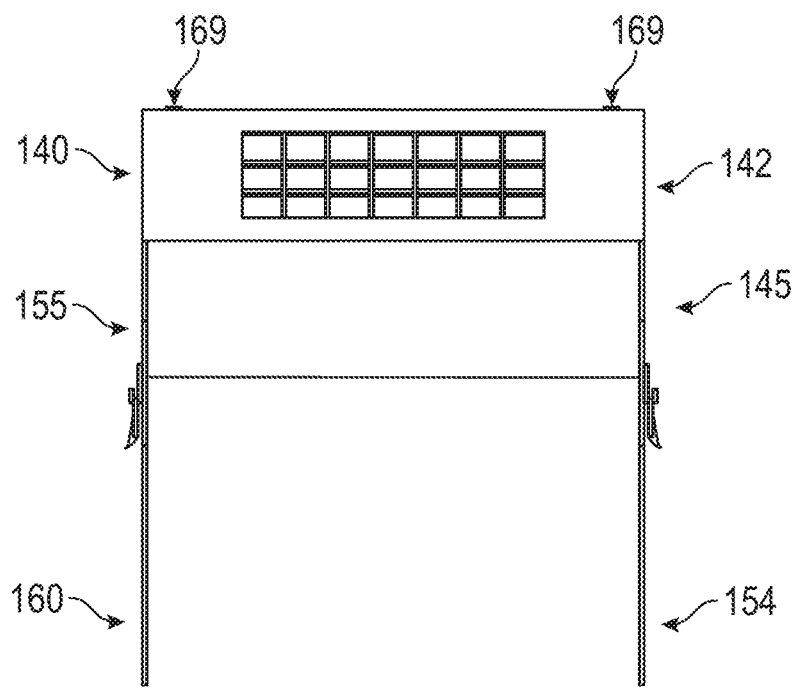
FIG. 4 is a rear elevation view of the top portion of FIG. 2.
Figure 5:
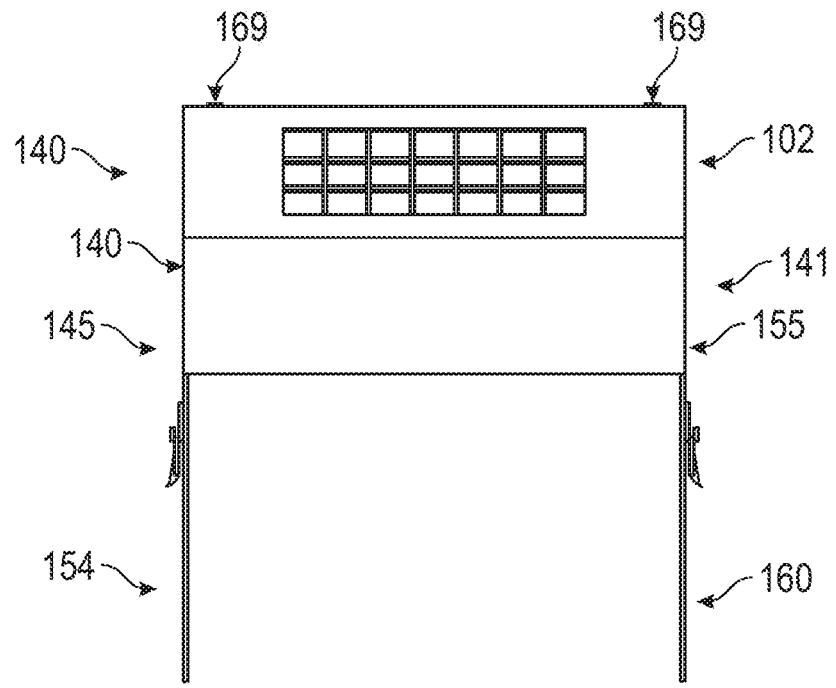
FIG. 5 is a front elevation view of the top portion of FIG. 2.
Figure 6:
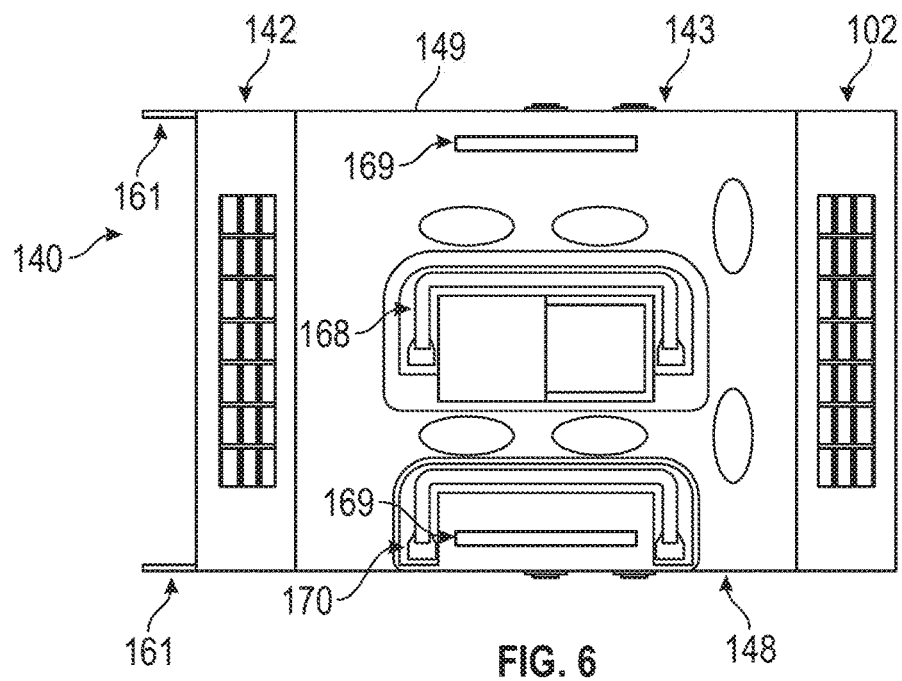
FIG. 6 is a top plan view of the top portion of FIG. 2.
Figure 7:
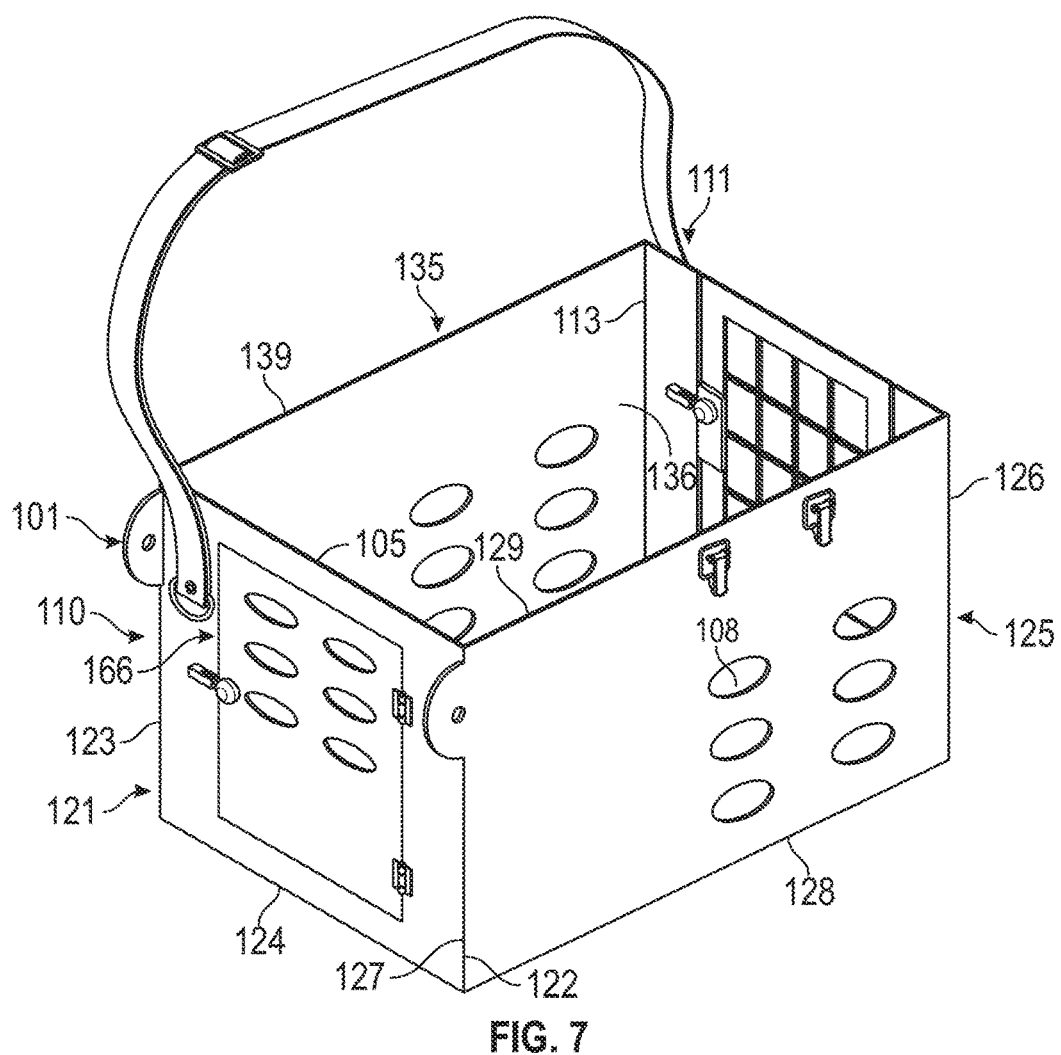
FIG. 7 is a perspective view of a bottom portion of the pet carrier of FIG. 1.
Figure 8:
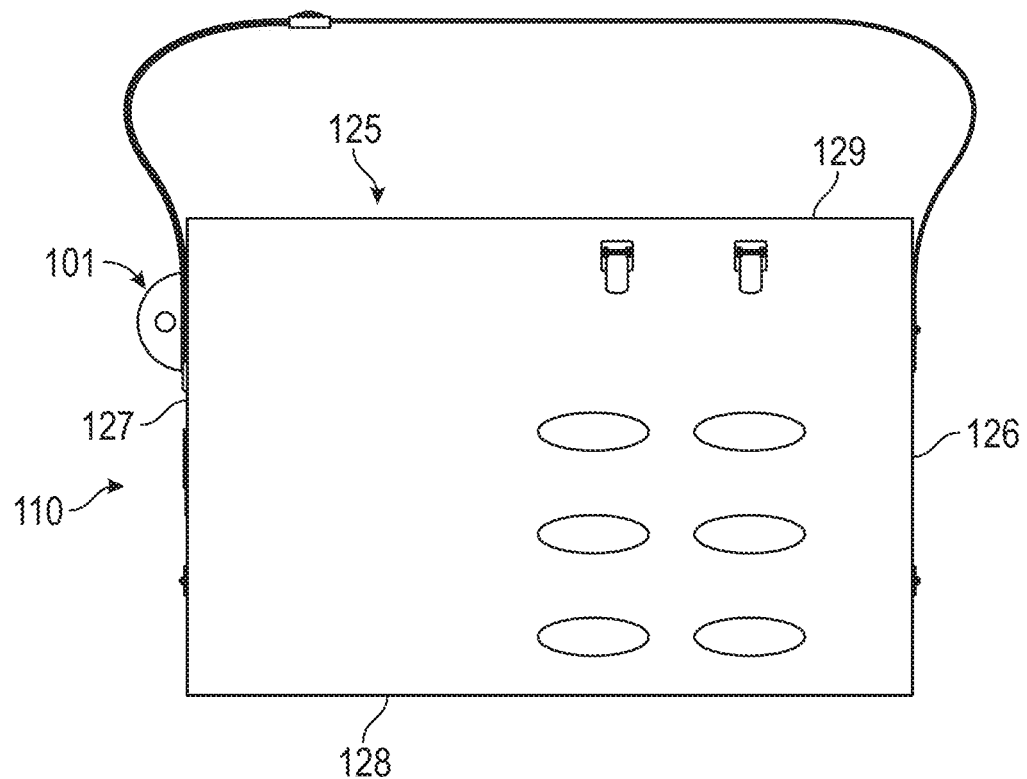
FIG. 8 is a side elevation view of the bottom portion of FIG. 7.
Figure 9:
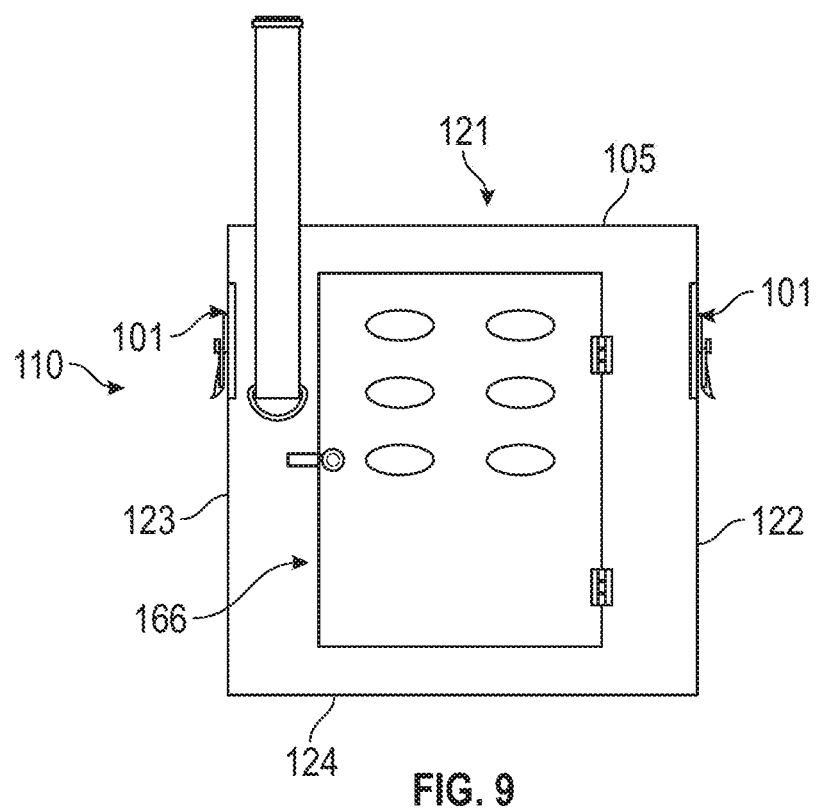
FIG. 9 is a rear elevation view of the bottom portion of FIG. 7 with a rear door.
Figure 10:
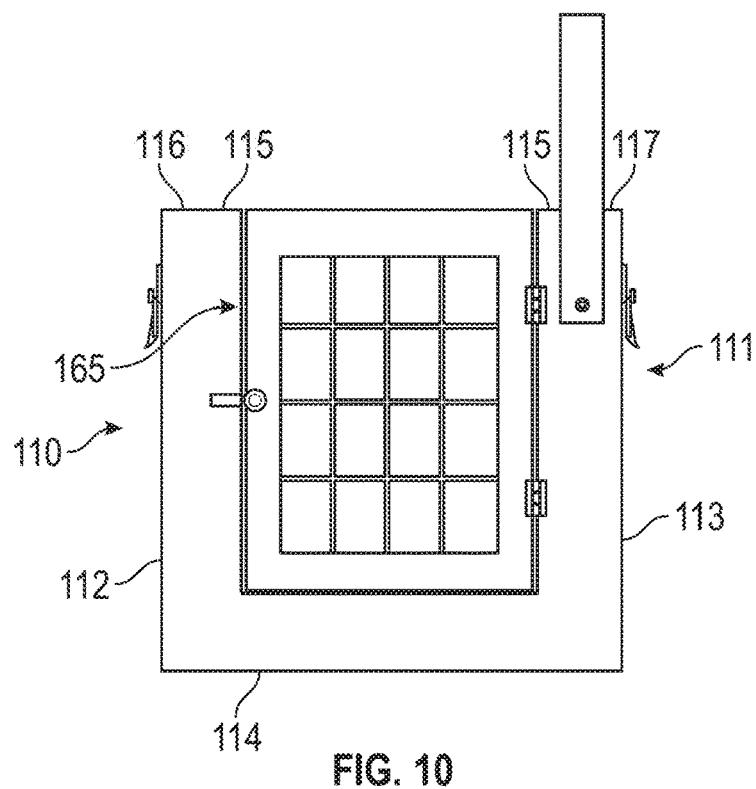
FIG. 10 is a front elevation view of the bottom portion of FIG. 7 with a front door.
Figure 11:
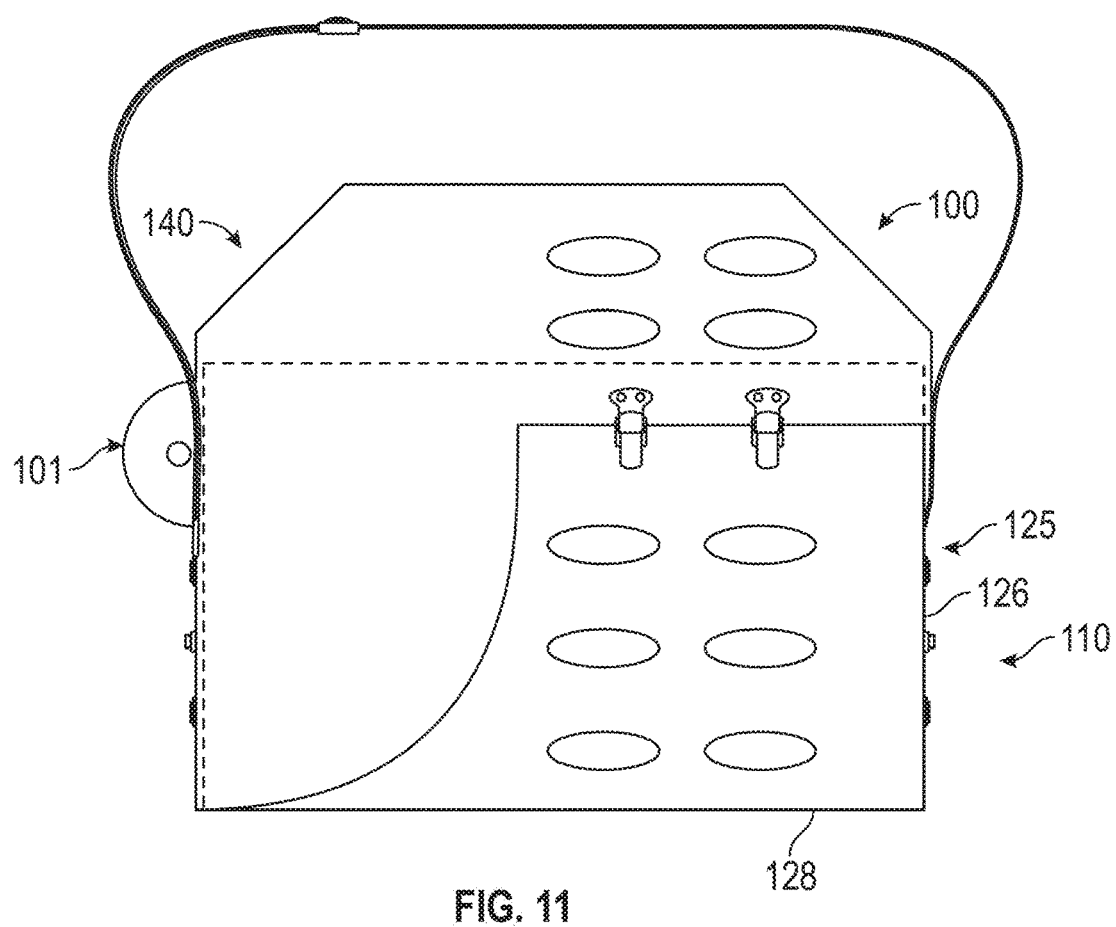
FIG. 11 is a side elevation view of the pet carrier of FIG. 1.
Figure 12:
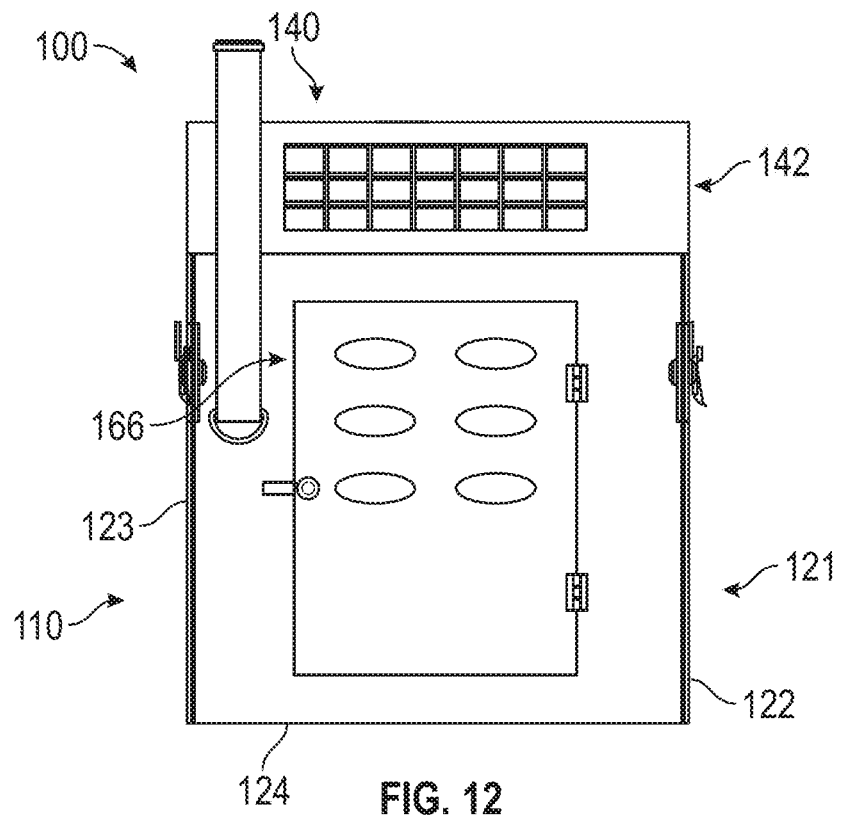
FIG. 12 is a rear elevation view of the pet carrier of FIG. 1.
Figure 13:
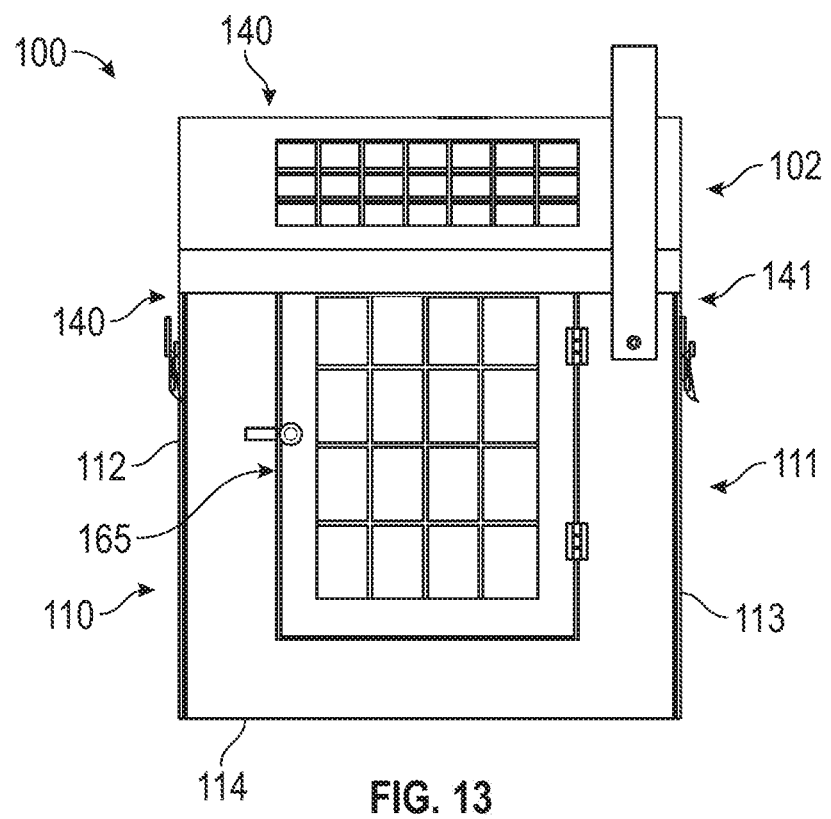
FIG. 13 is a front elevation view of the pet carrier of FIG. 1.
Figure 14:
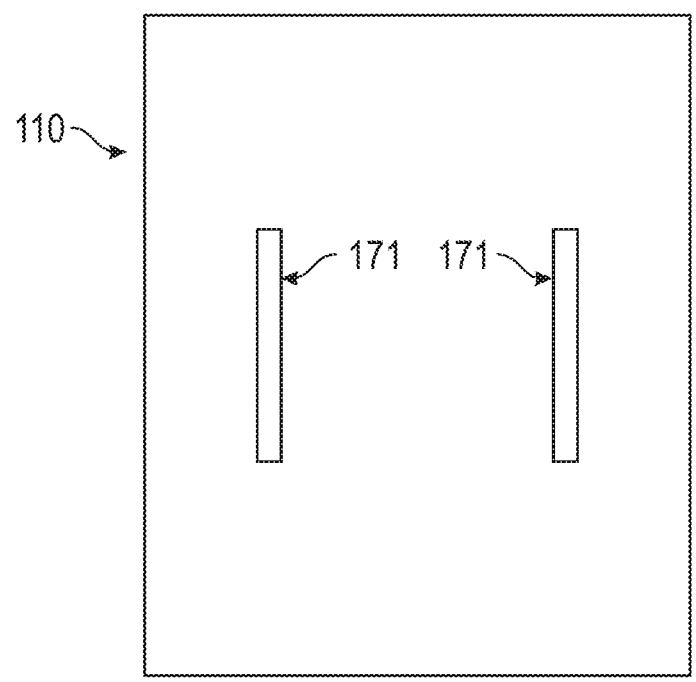
FIG. 14 is a bottom plan view of the bottom portion of FIG. 7.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a pet carrier 100 including a bottom portion 110 and a top portion 140.

The bottom portion 110 may have a front wall 111, a back wall 121, a first side wall 125, a second side wall, 135, and a floor 138.

The first side wall 125 may be rectangular and have four edges. A first edge 126 of the first side wall 125 may oppose a second edge 127 of the first side wall 125. A third edge 128 of the first side wall 125 may oppose a fourth edge 129 of the first side wall 135. The first edge 126 and second edge 127 may extend between the third edge 128 and fourth edge 129.

The second side wall 135 may be rectangular and have four edges. The second side wall 135 may mirror the first side wall 125. A first edge 136 of the second side wall 135 may oppose a second edge 137 of the second side wall 135. A third edge 138 of the second side wall 135 may oppose a fourth edge 139 of the second side wall 135. The first edge 136 and second edge 137 may extend between the third edge 138 and fourth edge 139.

The front wall 111 may have three outer edges and be rectangular with a u-shaped recess adapted to receive a door 165. A first edge 112 of the front wall 111 may oppose a second edge 113. A third edge 114 of the front wall 111 may oppose a fourth edge 115. The fourth edge 115 may be discontinuous with a first portion 116 proximate the first edge 112 and a second portion 117 proximate the second edge 113. There may be a u-shaped recess between the first portion 116 and second portion 117.

The back wall 121 may be rectangular and have four edges. A first edge 122 of the back wall 121 may oppose a second edge 123 of the back wall 121. A third edge 124 of the back wall may oppose a fourth edge 105 of the back wall 121. The first edge 122 and second edge 123 may extend between the third edge 124 and fourth edge 105.

The floor 108 of the bottom portion 110 may secure to the front wall 111, first side wall 125, second side wall 135, and back wall 121 to form an enclosure having an open side, through which animals may be placed into or removed from the enclosure. The top portion 140 of the pet carrier 100 may be placed over the open side of the bottom portion 110 to secure an animal within the pet carrier 100. The floor 108 may be rectangular and have four edges.

The first edge 126 of the first side wall 125 may secure to a first edge 112 of the front wall 111. The second edge 127 of the first side wall 125 may secure to a first edge 122 of the back wall 121. The third edge 128 of the first side wall 125 may secure to a first edge of the floor 108.

The first edge 136 of the second side wall 135 may secure to a second edge 113 of the front wall 111. The second edge 137 of the second side wall 135 may secure to a second edge 123 of the back wall 121. The third edge 138 of the second side wall 135 may secure to a second edge of the floor 108.

A third edge of the floor 108 may secure to a third edge 114 of the front wall 111. A fourth edge of the floor 108 may secure to a third edge 124 of the back wall 121. Each attachment of an edge of the floor 108 may form a 90-degree angle with the edge to which it is secured.

A plurality of attachment portions 101 may be secured to the back wall 121 or to either the first side wall 125 or second side wall 135 proximate the back wall 121. In one embodiment, each of the one or more attachment portions 101 may extend away from the back wall 121 distal the front wall 111.

The top portion 140 may have a front wall 141, a back wall 142, a first side wall 145, a second side wall 155, a ceiling 143, a first lobe 154, and a second lobe 160.

The first side wall 145 of the top portion 140 may be a polygon and have at least four edges. A first edge 146 of the first side wall 145 may oppose a second edge 147 of the first side wall 145. The first edge 146 and second edge 147 may extend parallel to one another and parallel to the third edge 128 and fourth edge 129 of the first side wall 125 of the bottom portion 110.

The second side wall 155 of the top portion 140 may be a polygon and have at least four edges. The second side wall 155 may mirror the first side wall 145. A first edge 156 of the second side wall 155 may oppose a second edge 157 of the second side wall 155. The first edge 156 and second edge 157 may extend parallel to one another and parallel to the third edge 138 and fourth edge 139 of the second side wall 135 of the bottom portion 110.

The front wall 141 of the top portion 140 may have four outer edges and be rectangular with at least one edge adapted to extend below an entirety of the fourth edge 115 of the front wall 111 of the bottom portion 110 when the pet carrier 100 is in a closed configuration. A first edge of the front wall 141 may oppose a second edge. A third edge of the front wall 141 may oppose a fourth edge. The first edge and second edge may connect to the third edge and fourth edge.

The back wall 142 of the top portion 140 may be rectangular and have four edges. A first edge of the back wall 142 may oppose a second edge of the back wall 142. A third edge of the back wall 142 may oppose a fourth edge of the back wall 142. The first edge and second edge 123 may extend between the third edge and fourth edge.

The ceiling 143 of the top portion 140 may be rectangular and have four edges. A first edge 148 of the ceiling 143 may oppose a second edge 149 of the ceiling 143. A third edge of the ceiling 148 may oppose a fourth edge of the ceiling 143. The first edge 148 and second edge 149 may extend between the third edge and fourth edge.

The first edge 146 of the first side wall 145 may secure to a first edge 148 of the ceiling 143. The second edge 147 of the first side wall 145 may extend below the fourth edge 129 of the first side wall 125 of the bottom portion 110 when the pet carrier is in a closed configuration.

The first edge 156 of the second side wall 155 may secure to a second edge 149 of the ceiling 143. The second edge 157 of the second side wall 155 may extend below the fourth edge 139 the second side wall 135 of the bottom portion 110 when the pet carrier is in a closed configuration.

The ceiling 143 may secure to the front wall 141, first side wall 145, second side wall 155, and back wall 142 to form an enclosure having an open bottom.

A plurality of attachment portions 161 may be secured to the back wall 142 or to either the first side wall 145 or second side wall 155 proximate the back wall 142. In one embodiment, each of the one or more attachment portions 161 may extend away from the back wall 142 distal the front wall 141. The attachment portion 161 of the top portion 140 may be adapted to rotatably secure to the attachment portion 101 of the bottom portion 110. The pet carrier 100 may be positionable in a closed or open configuration. In the closed configuration, the top portion 140 is rotated into a position placing the ceiling 143 directly above the floor 108 forming an enclosed space therebetween. In the open configuration the top portion 140 is rotated 180 degrees about the attachment portions 101, 161 to place the front wall 141 of the top portion 140 distal the front wall 111 of the bottom portion 110 forming an open chamber.

In embodiments having lobes, a first lobe 154 may be secured to and extend downward, distal the ceiling 143, from the second edge 147 of the first side wall 145 of the top portion 140. A second lobe 160 may be secured to and extend downward, distal the ceiling 143, from the second edge 157 of the second side wall 155 of the top portion 140. The lobes 154, 160 may be adapted to limit the gap formed between the fourth edges 129, 139 of the first and second side walls 125, 135 of the bottom portion 110 and the second edges 147, 157 of the first and second side walls 145, 155 of the top portion 140 as the pet carrier 100 is transitioned between closed and open configurations. Limiting this gap may be beneficial to any animal carried within the pet carrier 100 as the smaller the gap is, the lest change the animal may see in its environment as the top portion 140 is rotated between open and closed positions. When in the open configuration, a portion of the first lobe 154 overlaps a fourth edge 129 of the first side wall 125 of the bottom portion 110 and a portion of the second lobe 160 overlaps a fourth edge 139 of the second side wall 135 of the bottom portion 110. In the closed configuration, a second edge 147 of the first side wall 145 of the top portion 140 overlaps the fourth edge 129 of the first side wall 125 of the bottom portion 110 and a second edge 157 of the second side wall 155 of the top portion 140 overlaps the fourth edge 139 of the second side wall 135 of the bottom portion 110. The lobes 154, 160 may have curved edges. A radius of curvature for each of the lobes 154, 160 may extend from the respective attachment points toward the front of the pet carrier 100.

The second edge 127 of the first side wall 125 may have a length greater than a length of the first edge 126 of the first side wall 125. The second edge 137 of the second side wall 135 may have a length greater than a length of the first edge 136 of the second side wall 135.

The pet carrier 100 may have a plurality of fasteners to secure the top portion 140 and bottom portion 110 in the closed configuration. A first fastener component 162 may be secured to the top portion 140 proximate a second edge 147, 157 of the first or second side wall 145, 155. A second fastener component 163 may be secured to the bottom portion 110 proximate a fourth edge 129, 139 of the first or second side walls 125, 135. The first fastener component 162 and second fastener component 163 may be cooperatively configured to secure to one another and retain the pet carrier 100 in the closed configuration. Fasteners may be cooperatively positioned on the first portion 116 or second portion 117 of the fourth edge 115 of the front wall 111 of the bottom portion and a corresponding location on the front wall 141 of the top portion. Fasteners may be positioned on a fourth edge 105 of the back wall 121 of the bottom portion 110 with a corresponding fastener located on a back wall 142 of the top portion 140. The fasteners may be snap latches or the lock.

A first door 165 may be retained in the u-shaped recess of the front wall 111 of the bottom portion 110. The top of the first door 165 may be even with the fourth edge 115 of the front wall 111 and between the first portion 116 and second portion 117 of the fourth edge 115 of the front wall 111. The absence of any portion of the front wall 111 extending above the door 165 may be beneficial to an animal traveling through the door way. When the door 165 is in the open position, an animal may walk through the door way without having to walk under an obstruction. This may be particularly beneficial when the door 165 is open and the pet carrier 100 is in an open configuration. The absence of any structure above the door may relieve anxiety in the animal and encourage it to walk through the doorway either into or out of the pet carrier 100. The door 165 may be secured in a closed configuration with a latch or other securing mechanism.

A second door 166 may be carried by the back wall 121 of the bottom portion 110. The door 166 may be secured in a closed configuration with a latch or other securing mechanism.

Each of the securing mechanism for the doors 165, 166 may include a first portion fixedly secured to the bottom portion 110 and a second portion secured to the respective door 165, 166. The second portion may include a securing member, which may be actuated to engage with and disengage from the first portion of the securing mechanism. When the securing member is engaged with the first portion of the securing mechanism, the door may be prevented from opening and may secure an animal inside the pet carrier 100. When the securing member is disengaged from the first portion of the securing mechanism, the door may be opened to allow an animal to enter or exit the pet carrier 100 through the door opening. The second portion of the securing mechanism may include a knob or similar device, which may be rotated to selectively position the securing member between the engaged and disengaged positions. Rotation of the knob in a first direction may cause a first lateral movement of the securing member and position the securing member in the engaged position. Rotation of the knob in a second, opposing direction may cause a second lateral movement of the securing member, in a direction opposing the first lateral movement, and position the securing member in the disengaged position.

Either or both of the first door 165 and second door 166 may include one or more apertures for ventilation. In one embodiment, either or both doors 165, 166 may be formed from a solid material having apertures formed therein. In another embodiment, either or both doors 165, 166 may be screen-type doors formed from flexible or inflexible wires interconnecting to form apertures therebetween.

The pet carrier 100 may include a shoulder strap 167 secured to the top portion 140 or bottom portion 110. In one embodiment, a first end of the shoulder strap 167 may secure to a back wall 121 of the bottom portion 110 and a second, opposing end of the shoulder strap 167 may secure to the front wall 111 of the bottom portion 110. The shoulder strap 167 may be sized and configured to allow a handler of the pet carrier 100 to place the shoulder strap 167 over his or her should while resting a first side wall 125 or second side wall 135 against his or her hip, torso, or leg. The shoulder strap 167 may be removably secured to the top portion 140 or bottom portion 110 of the pet carrier 100 at shoulder strap attachment points. The shoulder strap attachment points may include, but are not limited to, snaps, rivets, clips, or the like. The shoulder strap 167 may be adjustable and may be adjusted to be long enough to wear across the head and chest of a user or may be adjusted to be short enough to wear over a shoulder. In one embodiment, the shoulder strap 167 may be an elongate, flexible material with a first end secured to the pet carrier 100. The elongate, flexible material may pass through a D-ring, or the like, at a second attachment point. The second end of the shoulder strap 167 may secure to a strap adjuster carried on the length of the elongate, flexible material. The strap adjuster may be positioned along the length to adjust length of the strap. Moving the strap adjuster closer to the second attachment point may result in a longer strap 167 while positioned the strap adjuster further away from the second attachment point may result in a shorter strap 167 length.

The pet carrier 100 may include a handle 168 secured to the ceiling 143 of the top portion 140. The handle 168 may have opposing first and second ends, each of which may be hingedly secured to the ceiling 143. The handle 168 may be selectively positioned between a deployed and a stowed configuration. In the deployed configuration, the handle may be positioned to extend perpendicularly away from an outer surface of the ceiling 143. In this deployed configuration, a handler may grasp the handle 168 and lift the pet carrier 110. The first handle end may be secured to the ceiling 143 with a hinge at a first handle attachment point, which may be positioned along a centerline of the top portion 140 and the second handle end may be secure to the ceiling 143 with a hinge at a second handle attachment point, which may also be positioned along the centerline. The centerline of the top portion 140 may extend parallel to the first edge 148 of the ceiling 143. The attachment points of the handle 168 may be located within a recess located on the outer surface of the ceiling 143. In the stowed configuration, the handle 168 may be folded down to lay against the outer surface of the ceiling 143 within the recess. The handle 168 may be positioned about a sliding door 172 located on the ceiling 143.

In one embodiment, a second handle 170 may be used in conjunction with the shoulder strap 167 to provide stability for the user and the pet within the carrier 100. The shoulder strap 167 may be worn by the user while the handle 170 may be positioned near the side of the carrier 100 distal the user's body. The user may grasp the handle 170 to provide support for the carrier and situate the weight of the carrier against the user's torso, hip, or leg. Positioning the carrier 100 in this way may be beneficial to the pet inside the carrier 100 because it allows the pet to remain physically close to the user. In such an embodiment, the handle 170 may be hingedly secured to the top portion proximate a first or second side wall 125, 135 and positionable between a deployed and stowed configuration. In the deployed configuration, the handle 170 may be rotated to extend upward from the ceiling 143 proximate the side wall to which the handle 170 is secured. In the stowed configuration, the handle 170 may be rotated to rest along an outer surface of the ceiling 143, within a recess located below the upper level of the ceiling 143. The recess may be formed within the outer surface of the ceiling 143 and adapted to receive the handle 170 in the stowed configuration.

One or more walls of the pet carrier 100 may include apertures for ventilation or viewing. Specifically, the first side wall 125 and second side wall 135 of the bottom portion 110 may include apertures for ventilation or viewing. The ceiling 143 may include apertures for ventilation or viewing. The apertures may be formed from a solid material with apertures formed therein. The apertures may be covered with a screen formed from flexible or inflexible wires interconnecting to form apertures therebetween. A plurality of apertures may be formed in solid material comprising the first side wall 125, second side wall 135, and ceiling 143. A plurality of screens may be secured in apertures formed in the first side wall 125, second side wall 135, and ceiling 143. An aperture covered by a screen material may be defined as a viewing port.

In one embodiment, the top portion 140 may have a front portion 102 located between the ceiling 143 and the front wall 141. The front portion 102 may be secured to the ceiling 143 at an angle greater than 90 degrees and may also be secured to the front wall 141 at an angle greater than 90 degrees. Apertures may be located in the front portion 102 to allow visualization or ventilation within the carrier 100.

The pet carrier 100 may include a sliding door 172 carried in the ceiling 143 and slidably positionable between an open configuration and a closed configuration. The ceiling 143 may have a recess located on an outer surface. The sliding door 172 may be located within this recess and configured to not rise above an upper surface of the ceiling 143. In the closed configuration, the sliding door 172 may be positioned over an aperture in the ceiling 143. In the open configuration, the sliding door 172 may be positioned on the ceiling 143 at a position adjacent the aperture and allow access into the pet carrier 100 through the ceiling 143 aperture. The sliding door 172 may be translucent, transparent, or opaque.

A plurality of pet carriers 100 may be stacked upon one another. Each pet carrier may have one or more ridges 169 located on an outer surface of the ceiling 143. Each pet carrier may have one or more recesses 171 located on an outer surface of the floor 108. Each of the recesses 171 may be configured to receive a ridge 169 when one pet carrier 100 is stacked upon another.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A pet carrier comprising:
   a bottom portion comprising:
      a front wall,
      a back wall,
      a first side wall having a first edge secured to a first edge of the front wall and second edge secured to a first edge of the back wall,
      a second side wall having a first edge secured to a second edge of the front wall, which opposes the first edge of the front wall, and a second edge secured to a second edge of the back wall, which opposes the first edge of the back wall,
      a floor secured to a third edge of the front wall, wherein the third edge of the front wall extends from the first edge of the front wall to the second edge of the front wall, a third edge of the back wall, wherein the third edge of the back wall extends from the first edge of the back wall to the second edge of the back wall, a third edge of the first side wall, wherein the third edge of the first side wall extends from the first edge of the first side wall to the second edge of the first side wall, and a third edge of the second side wall, wherein the third edge of the second side wall extends from the first edge of the second side wall to the second edge of the second side wall,
      a first attachment portion secured to the back wall of the bottom portion and extending away from the back wall of the bottom portion distal the front wall of the bottom portion, and
      a second attachment portion secured to the back wall of the bottom portion and extending away from the back wall of the bottom portion distal the front wall of the bottom portion, and
   a top portion comprising:
      a ceiling,
      a first side wall having a first edge secured to a first edge of the ceiling,
      a second side wall having a first edge secured to a second edge of the ceiling, which opposes the first edge of the ceiling,
      a first attachment portion secured to the first side wall of the top portion or the second side wall of the top portion,
      a first lobe extending from a portion of the first side wall distal the ceiling, wherein the first lobe has a radius of curvature extending from the first attachment portion of the top portion, a second attachment portion secured to the first side wall of the top portion or the second side wall of the top portion, opposing the first attachment portion of the too portion, and a second lobe extending from a portion of the second side wall distal the ceiling, wherein the second lobe has a radius of curvature extending from the second attachment portion of the top portion, wherein the too portion is positionable in an open configuration, in which a portion of the first lobe overlaps a fourth edge of the first side wall of the bottom portion, which opposes the third edge of the first side wall of the bottom portion, and a portion of the second lobe overlaps a fourth edge of the second side wall of the bottom portion, which opposes the third edge of the second side wall of the bottom portion, or rotatable 180 degrees with respect to the bottom portion to a closed configuration in which a second edge of the first side wall of the top portion, which opposes the first edge of the first side wall of the top portion, overlaps the fourth edge of the first side wall of the bottom portion and a second edge of the second side wall of the top portion, which opposes the first edge of the second side wall of the top portion, overlaps the fourth edge of the second side wall of the bottom portion; and wherein the attachment portion of the bottom portion rotatably secures to the attachment portion of the top portion.

2. The pet carrier of claim 1 further comprising:
a first door carried in the front wall of the bottom portion.

3. The pet carrier of claim 2 wherein the front wall of the bottom portion further comprises:
a fourth edge, extending from the first edge to the second edge and opposing the third edge, having a first portion approximate the first edge, a second portion approximate the second edge, and a void located between the first portion and second portion, wherein the first door is carried within the void.

4. The pet carrier of claim 2 further comprising:
a second door carried in the back wall of the bottom portion.

5. The pet carrier of claim 4 wherein the first door comprises a mesh screen and the second door comprises a plurality of apertures formed in a solid material.

6. The pet carrier of claim 4 wherein the first door is hingedly secured to the front wall of the bottom portion and the second door is hingedly secured to the back wall of the bottom portion.

7. The pet carrier of claim 1 further comprising a securing mechanism having a first portion secured to the bottom portion and a second portion secured to a door, wherein the second portion has a device rotatably activated to engage a member of the second portion with the first portion to prevent movement of the door relative to the bottom portion.

8. The pet carrier of claim 1 further comprising:
a shoulder strap having a first end removably secured to the bottom portion at a first shoulder strap attachment point and a second end removably secured to the bottom portion at a second shoulder strap attachment point.

9. The pet carrier of claim 1 further comprising a door carried by the ceiling of the top portion and slidably positionable between an open configuration and a close configuration.

10. The pet carrier of claim 9 further comprising a handle hingedly secured to the top portion around a perimeter of the door, wherein the handle is selectively positionable between an upright and a stowed position, wherein the stowed position is defined as placement of the door within a recess of the ceiling.

11. The pet carrier of claim 1 further comprising a handle secured to the top portion along an outer side of the first side wall or the second side wall, wherein the handle is positionable between a deployed and a stowed configuration.

12. The pet carrier of claim 1 further comprising a first viewing port and a second viewing port located in the ceiling.

13. The pet carrier of claim 1 comprising a recess located on a lower surface of the floor.

14. The pet carrier of claim 13 comprising a ridge located on an upper surface of the ceiling, wherein the recess is sized to receive the ridge when a first pet carrier is stacked atop a second pet carrier.

15. The pet carrier of claim 1 further comprising a first securing member secured to the bottom portion and a second securing member secured to the top portion wherein the first securing member and second securing member are cooperatively configured to removably secure the top portion to the bottom portion.

16. The pet carrier of claim 1 wherein the first side wall of the bottom portion and the second side wall of the bottom portion comprise apertures adapted for ventilation.

17. A pet carrier comprising:
a bottom portion comprising:
a front wall,
a back wall,
a first side wall having a first edge secured to a first edge of the front wall and second edge secured to a first edge of the back wall,
a second side wall having a first edge secured to a second edge of the front wall, which opposes the first edge of the front wall, and a second edge secured to a second edge of the back wall, which opposes the first edge of the back wall,
a floor secured to a third edge of the front wall, wherein the third edge of the front wall extends from the first edge of the front wall to the second edge of the front wall, a third edge of the back wall, wherein the third edge of the back wall extends from the first edge of the back wall to the second edge of the back wall, a third edge of the first side wall, wherein the third edge of the first side wall extends from the first edge of the first side wall to the second edge of the first side wall, and a third edge of the second side wall, wherein the third edge of the second side wall extends from the first edge of the second side wall to the second edge of the second side wall,
a first attachment portion secured to the back wall of the bottom portion and extending away from the back wall of the bottom portion distal the front wall of the bottom portion, and
a second attachment portion secured to the back wall of the bottom portion and extending away from the back wall of the bottom portion distal the front wall of the bottom portion; and
a top portion comprising:
a ceiling,
a first side wall having a first edge secured to a first edge of the ceiling,
a second side wall having a first edge secured to a second edge of the ceiling, which opposes the first edge of the ceiling, a first attachment portion secured to the first side wall of the top portion or the second side wall of the too portion, a first lobe extending from a portion of the first side wall distal the ceiling, wherein the first lobe has a radius of curvature extending from the first attachment portion of the top portion, a second attachment portion secured to the first side wall of the too portion or the second side wall of the top portion, opposing the first attachment portion of the too portion, and a second lobe extending from a portion of the second side wall distal the ceiling, wherein the second lobe has a radius of curvature extending from the second attachment portion of the top portion; and wherein the first attachment portion of the bottom portion rotatably secures to the first attachment portion of the top portion; and wherein the top portion is positionable in an open configuration, in which a portion of the first lobe overlaps a fourth edge of the first side wall of the bottom portion, which opposes the third edge of the first side wall of the bottom portion, and a portion of the second lobe overlaps a fourth edge of the second side wall of the bottom portion, which opposes the third edge of the second side wall of the bottom portion, or rotatable 180 degrees with respect to the bottom portion to a closed configuration in which a second edge of the first side wall of the top portion, which opposes the first edge of the first side wall of the top portion, overlaps the fourth edge of the first side wall of the bottom portion and a second edge of the second side wall of the top portion, which opposes the first edge of the second side wall of the top portion, overlaps the fourth edge of the second side wall of the bottom portion.

18. The pet carrier of claim 17 further comprising:

a first door carried in the front wall of the bottom portion; and wherein the front wall of the bottom portion further comprises:

a fourth edge, extending from the first edge to the second edge and opposing the third edge, having a first portion approximate the first edge, a second portion approximate the second edge, and a void located between the first portion and second portion, wherein the first door is carried within the void.

* * * * *